United States Patent [19]

Nodelman

[11] Patent Number: 5,003,027

[45] Date of Patent: Mar. 26, 1991

[54] ESTER GROUP CONTAINING POLYOLS IN A RIM PROCESS

[75] Inventor: Neil H. Nodelman, Pittsburgh, Pa.

[73] Assignee: Mobay Corporation, Pittsburgh, Pa.

[21] Appl. No.: 495,520

[22] Filed: Mar. 13, 1990

Related U.S. Application Data

[63] Continuation-in-part of Ser. No. 302,655, Jan. 27, 1989, abandoned, which is a continuation-in-part of Ser. No. 83,558, Aug. 7, 1987, abandoned.

[51] Int. Cl.$^5$ .................. C08G 18/32; C08G 18/42
[52] U.S. Cl. .......................... 528/79; 528/73; 528/83
[58] Field of Search ............................ 528/73, 83, 79

[56] References Cited

U.S. PATENT DOCUMENTS

| | | | |
|---|---|---|---|
| 3,726,952 | 4/1973 | Boden et al. | 264/48 |
| 4,039,487 | 8/1977 | Kolskowski et al. | 260/2.5 |
| 4,065,410 | 12/1977 | Schafer et al. | 252/182 |
| 4,218,543 | 8/1980 | Weber et al. | 521/51 |
| 4,256,795 | 3/1981 | Day et al. | 528/73 |
| 4,288,564 | 9/1981 | Conover et al. | 521/122 |
| 4,314,038 | 2/1982 | Markers | 521/167 |
| 4,341,875 | 7/1982 | Visger et al. | 521/164 |
| 4,403,093 | 9/1983 | Hartman et al. | 528/297 |
| 4,442,235 | 4/1984 | Taylor et al. | 521/122 |
| 4,481,309 | 11/1984 | Strachle et al. | 521/172 |
| 4,504,606 | 3/1985 | Kordemenes | 528/73 |
| 4,519,965 | 5/1985 | Taylor et al. | 264/51 |
| 4,540,768 | 9/1985 | Speranza et al. | 528/79 |
| 4,542,165 | 9/1985 | Kumata et al. | 528/73 |
| 4,581,396 | 4/1986 | Sonnenberg | 524/87 |
| 4,590,219 | 5/1986 | Nissen et al. | 521/51 |
| 4,595,705 | 6/1986 | Werner et al. | 521/51 |
| 4,602,070 | 7/1986 | Cavitt et al. | 528/73 |
| 4,764,540 | 8/1988 | Dewhurst et al. | 521/110 |
| 4,789,688 | 12/1988 | Dewhurst et al. | 521/110 |

FOREIGN PATENT DOCUMENTS

| | | |
|---|---|---|
| 1155908 | 10/1963 | Fed. Rep. of Germany . |
| 3215908 | 11/1983 | Fed. Rep. of Germany ........ 528/79 |
| 131228 | 5/1989 | Japan ........................ 528/79 |
| 1534258 | 11/1978 | United Kingdom . |

Primary Examiner—John Kight, III
Assistant Examiner—Dennis R. Daley
Attorney, Agent, or Firm—Joseph C. Gil; Richard E. L. Henderson

[57] ABSTRACT

The present invention is directed to an improved process for the production of polyurethane moldings by reacting a reaction mixture comprising (a) a polyisocyanate, (b) an isocyanate-reactive material, and (c) a chain extender and/or cross-linker, said reaction mixture being processed as a one-shot system by the RIM process at an isocyanate index of from about 70 to about 130. In the improvement, component (b) comprises a polyester polyol having a molecular weight of from about 840 to about 1500 and having the structure

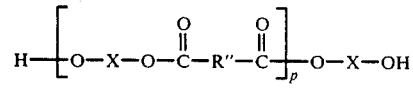

wherein
X represents

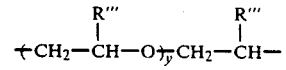

R" represents the residue of an aromatic anhydride or aromatic dicarboxylic acid,
R'" represents hydrogen or methyl,
p is a number of from 1 to about 5, and
y is a number of from 1 to about 14.

10 Claims, No Drawings

ESTER GROUP CONTAINING POLYOLS IN A RIM PROCESS

This application is a continuation-in-part of Application Ser. No. 302,655, filed Jan. 27, 1989, which is in turn a continuation-in-part of Application Ser. No. 083,558, filed Aug. 7, 1987, now abandoned.

BACKGROUND OF THE INVENTION

Polyester polyols produced from dicarboxylic acid anhydrides, polyols and polyepoxides are known. For example, in U.S. Pat. No.4,403,093, such polyester polyols are produced by first reacting a 1,2-dicarboxylic acid anhydride with a polyol under conditions sufficient to form a half-ester which is then reacted with a polyepoxide. The resultant polyester oligomers are described as being useful as resinous binders in high solid containing compositions.

Polyester polyols produced from aromatic acids and polyoxyethylene glycols are known and are described as being useful in the production of rigid polyurethane foams (see, e.g., U.S. Pat. No.4,039,487 and German Auslegeschrift 1,155,908).

In the known polyurethane/urea reaction injection molding (RIM) process, a wide variety of different polyols have been suggested (see e.g., U.S. Pat. Nos. 3,726,952, 4,218,543, 4,288,564, 4,442,235, 4,519,965, 4,581,396, 4,764,540, and 4,789,688; and British Patent 1,534,258. Similarly, polyester polyols of various types have been suggested for use in the RIM process (see, e.g., U.S. Pat. Nos. 4,065,410, 4,481,309, 4,590,219 and 4,595,705).

U.S. Pat. No.4,065,410 discloses a RIM process requiring a three-component polyol system that includes a polyhydroxyl compound having a molecular weight greater than about 1800 and a chain extender mixture consisting of ethylene glycol and at least one other polyol having a molecular weight below about 1800. The reference indicates that the higher molecular weight polyhydroxyl compounds can include polyester polyols derived from polyhydric alcohols and polycarboxylic acid but does not describe the use of polyester polyols as the lower molecular weight polyol component of the chain extender mixture. In contrast, the aromatic polyester polyols of the present invention, despite having molecular weights no greater than 1500, have been found to provide surprisingly advantageous processing advantages when compared to aromatic polyester polyols of the type described in the reference.

U.S. Pat. No.4,590,219 discloses a process using ester-terminated polyether polyols, polyester polyols formed from a mixture of at least three polyols, or a mixture thereof. The ester-terminated polyether polyols are formed by reaction of polyether polyols with lactones and are unlike the polyester polyols of the present invention. The polyester polyols are prepared by condensation of preferably aliphatic dicarboxylic acids and a mixture of at least three polyols.

U.S. Pat. No.4,595,705 discloses a RIM process using mixtures of conventional polyols and low molecular weight aromatic polyester polyols having molecular weights no greater than 700. In contrast, the polyester polyols used in the present invention are always aromatic and have molecular weights of about 840 to 1500 and provide excellent processing properties, even in the absence of the conventional polyols described in the reference.

SUMMARY OF THE INVENTION

The present invention is directed to certain aromatic polyester polyols that, when used in the RIM process, provide parts exhibiting unexpectedly improved flame properties. Moreover, the polyester polyols of the invention have generally lower viscosities than higher molecular weight polyols and are generally more compatible with the other components used in typical polyol blends. Thus, the polyester polyols of the invention exhibit advantageous processing properties. In particular, the present invention is directed to an improved process for the production of polyurethane moldings by reacting a reaction mixture comprising (a) a polyisocyanate,
(b) an isocyanate-reactive material, and
(c) a chain extender and/or cross-linker, said reaction mixture being processed as a one-shot system by the RIM process at an isocyanate index of from about 70 to about 130, wherein, in the improvement, component b) comprises a polyester polyol having a molecular weight of from about 840 to about 1500 (preferably 840 to 1450 and more preferably 1100 to 1450) and having the idealized structure

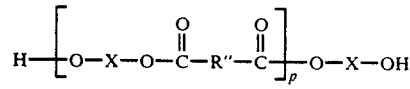

wherein
X represents

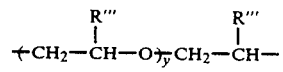

R" represents the residue of an aromatic anhydride or aromatic dicarboxylic acid,
R''' represents hydrogen or methyl,
y is a number of from 1 to about 14, and
p is a number of from 1 to about 5.

DETAILED DESCRIPTION OF THE INVENTION

The polyester polyols useful in this invention are prepared by art-recognized techniques from suitable diols corresponding to the formula HO-X-OH. Such polyester polyols are prepared, for example, by reacting a suitable aromatic anhydride or acid with the diol.

The values of y and p are, of course, limited to those values for which the molecular weights of the polyester polyols remain within the specified range of about 840 to about 1500. In general, the larger the value of y (and thus the chain length of group X), the smaller must be the value of p (representing the number of aromatic residues R"). In the preferred embodiments of the invention, R" is a phenylene (i.e., -C$_6$H$_4$), y is in the range of about 3 to about 14, and p is from 1 to about 4. In more preferred embodiments, R''' is additionally hydrogen. Thus, in one particularly preferred embodiment in which R" is a phenylene and R''' is hydrogen, y is about 3. In this preferred embodiment, therefore, p can range from about 2 to about 4. On the other hand, where R" is a phenylene, R''' is hydrogen, and y is about 14, p would be limited to about 1.

Suitable aromatic anhydrides include those which, exclusive of carbon atoms in the anhydride moiety, contain from about 6 to 14 carbon atoms. Particularly preferred aromatic anhydrides are cyclic anhydrides based on phthalic acid (that is, wherein R" is a 1,2-phenylene group). Substituted aromatic anhydrides can also be used, provided the substituents do not adversely affect the reactivity of the anhydride or the properties of the resultant polyester. Suitable substituents include chloro and alkoxy. Examples of suitable aromatic anhydrides include phthalic anhydride and tetrachlorophthalic anhydride. Acids such as isophthalic and terephthalic acids, as well as dimethyl esters of these acids produced via transesterification, are also useful.

Suitable polyols (corresponding to the formula HO-X-OH) used to prepare the polyester polyols of the invention include polyethylene glycols and polypropylene glycols, as well as mixtures containing polyethylene glycols and/or polypropylene glycols of various chain lengths. Suitable such polyols have molecular weights of from about 200 to about 700. The molecular weight of the polyol starting material is, of course, selected to assure that the molecular weight of the resultant component (b) remains within the specified range of about 840 to 1500. A particularly preferred polyol is a polyethylene glycol for which y is about 3. A commercially available polyethylene glycol for which y is approximately 3 is PEG 200 (essentially tetraethylene glycol), which has a molecular weight range of about 190 to 210. A polyester polyol according to the invention prepared from PEG 200 could have p in the range of about 2 to 4. Another particularly preferred polyol is a polyethylene glycol for which y is about 7 to 8. A commercially available polyethylene glycol for which y is between about 7 and 8 is PEG 400, which has a molecular weight range of about 190 to 210. A polyester polyol according to the invention prepared from PEG 400 could have p in the range of about 1 to 2.

The molecular weights of the polyester polyols can be determined by methods known in the art. For example, one can use titrimetrically determined hydroxyl numbers to calculate number-average equivalent weights or molecular weights, osmometry to determine molecular weights, or simple arithmetic calculations based on knowledge of well characterized chemical reactions. Thus, molecular weight can be calculated using the well-known formula for hydroxyl number $$\text{OH number} = \frac{56,100 \times \text{functionality}}{\text{molecular weight}}.$$

The polyester polyols of the present invention are liquid and are eminently suitable for use in a reaction injection molding (RIM) process. Polyol blends containing polyester polyols of molecular weights greater than about 1800 become difficult to process using the RIM process. This difficulty is due to high viscosity and the tendency toward blend incompatibility. As a result, the RIM parts become difficult to reproduce because of poor mixing. The suitability of the polyols used in the present invention is due in part to generally more advantageous viscosities and compatibility with other reaction components, even when compared with polyols having molecular weight only slightly greater than those used in the present invention. In addition, parts produced using the polyesters of the invention have excellent flame properties. As is known, the RIM process is a filling technique in which the highly active, liquid components are rapidly injected into a closed mold. Substantially any of the isocyanates, chain extenders, and cross-linkers known in the art can be used in addition to the polyesters described herein.

The invention is further illustrated but is not intended to be limited by the following examples, in which all parts and percentages are by weight unless otherwise specified.

EXAMPLES

Example 1

A 12 liter, three-neck flask was charged with 4506 parts of Carbowax 400 (a polyoxyethylene glycol of about 400 molecular weight) and heated to 100° C. with stirring. 2028 parts of Resin 565 (the diether of propylene glycol and bisphenol-A available from Dow) and 4.8 parts of Fascat 4102 (butyltin tricarboxylate available from M&T) were then added. Phthalic anhydride (1668 parts) was then added over a period of about 10 minutes. The temperature was then raised to 210° C. and held at that temperature for about 9½ hours with removal of water. The resultant product had an OH number of 77 (corresponding to a molecular weight of about 1450) and an acid number of 0.3. Viscosity at 25.C was 19,600 mPa.s.

Example 2

A 12 liter, three-neck flask was charged with 5600 parts of Carbowax 200 (a polyoxyethylene glycol of about 200 molecular weight and being essentially tetraethylene glycol) and heated to 100° C. with stirring. 2962 parts of phthalic anhydride and 5 parts of Fascat 4102 were added and the temperature was raised to 210° C. The temperature was maintained at 210° C. for about 7 hours with removal of water. The resultant product had an OH number of 100 (corresponding to a molecular weight of about ]]00) and an acid number of 0.2. Viscosity at 25° C. was 11,300 mPa.s.

Example 3 (comparison)

A 12 liter, three-neck flask was charged with 5195 i parts of Carbowax 200 and heated to 120° C. 3193 parts of phthalic anhydride and 2.1 parts of Fascat 4102 were then added. The temperature was raised to 210° C., and held at that temperature for about 14 hours with removal of water. The resultant product had an OH number of 60 (corresponding to a molecular weight of about 1900) and an acid number of 1.0. Viscosity at 25° C. was 50,500 mPa.s. This polyol, which is not within the molecular weight range of the polyols of the invention, was used in comparison Examples 9 and 10.

Examples 4 throuqh 10

In these examples various parts were made via the RIM process. The components used were as follows:

Polyol A—a glycerine-initiated polypropylene oxide product having an OH number of about 1050.

Polvol B—a glycerine initiated polypropylene oxide product having an OH number of about 28, and having ethylene oxide tips.

EG—ethylene glycol

Additive A—a quaternary ammonium salt of tall oil and the amide prepared from tall oil and N,N-dimethyl-1,3-propane-diamine.

DC 193—a silicone surfactant commercially available from Dow Corning.

PC 8—Polycat 8—N,N-dimethylcyclohexylamine, available from Air Products.
T-12—dibutyl tin dilaurate.
AB 19—Antiblaze 19, a cyclic phosphate ester flame retardant available from Mobil.
Iso—a 50/50 blend of Mondur PF and Mondur MR (two commercially available isocyanates from Mobay Corporation), having an isocyanate group content of about 27%.

The components and the amounts thereof were as indicated in Table I. Viscosities and compatibilities were determined for polyol blends prepared from the polyols of Examples 1–3, polyol A, or ethylene glycol (as appropriate for each of Examples 4–10), and AB 19. Blends are considered compatible (C) if they are homogeneous but incompatible (I) if biphasic or cloudy. Examples 4, 9, and 10 are comparison examples.

TABLE 1

| Example: | 4 | 5 | 6 | 7 | 8 | 9 | 10 |
| --- | --- | --- | --- | --- | --- | --- | --- |
| Component B | | | | | | | |
| Polyol A | 55 | 45 | — | 45 | — | 45 | — |
| Polyol B | 45 | — | — | — | — | — | — |
| EG | — | — | 25 | — | 25 | — | 25 |
| Polyol of Ex. 1 | — | 55 | 75 | — | — | — | — |
| Polyol of Ex. 2 | — | — | — | 55 | 75 | — | — |
| Polyol of Ex. 3 | — | — | — | — | — | 55 | 75 |
| Additive A | 6 | — | — | — | — | — | — |
| DC 193 | 3 | 3 | 3 | 3 | 3 | 3 | 3 |
| PC 8 | 1.3 | 1.0 | 1.0 | 1.0 | 1.0 | 1.0 | 1.0 |
| T 12 | 0.2 | 0.1 | 0.1 | 0.1 | 0.1 | 0.1 | 0.1 |
| AB 19 | 17 | 17 | 17 | 17 | 17 | 17 | 17 |
| Blend viscosity (40° C.), mPa.s | — | 1700 | 790 | 1200 | 360 | 1977 | 1277 |
| Compatibility | I | I | C | C | C | I | I |
| Component A | | | | | | | |
| Iso | 169 | 156 | 155 | 159 | 160 | 153 | 151 |

RIM plaques were prepared using a laboratory piston metering unit and clamping unit. The metering unit was a two component instrument having a maximum metering capacity of 0.6 liters. A rectangular mold, 300 mm×200 mm×8 mm, was used to mold the samples under the following conditions:

| | |
| --- | --- |
| Component A Temp | 32° C. |
| Component B Temp | 40° C. |
| Isocyanate Index | 110 |
| A/B Weight Rates | (125–140)/100 |
| Mold temperature | 60° C. |
| Impingement Pressure | 2646 psi |
| External Mold Release Agent | Silicone spray designated MR 515, available from Chemtrend |
| Demold time | 2 min |
| No post cure | |

Various physical properties and flame properties were tested, with the results as set forth in Table II.

The combination of properties for the molded products (especially flame spread properties) and processing advantages for the polyols and polyol blends (i.e., viscosity and compatibility) clearly show the advantage of using polyester polyols of the invention when compared to higher molecular weight polyols.

TABLE II

| ASTM Test | Example: | 4 | 5 | 6 | 7 | 8 | 9 | 10 |
| --- | --- | --- | --- | --- | --- | --- | --- | --- |
| D 792 | Density, pcf | 70.9 | 70.0 | 68.8 | 70.0 | 67.5 | 71.4 | 69.4 |
| D 256 | Charpy Impact, ft-lb/in$^2$ | 17.17 | 13.49 | 5.05 | 17.58 | 18.88 | 19.27 | 18.60 |
| D 790 | Flex. Mod. at RT, psi | 278,000 | 395,000 | 410,000 | 390,000 | 395,000 | 405,000 | 394,000 |
| D 648 | Heat distortion, °C. (60 psi) | 112 | 93.9 | 74 | 88 | 66.1 | 96.5 | 70.5 |
| E 162 | Radiant Panel Test (Flame Spread Index) | 217 | 110 | 119 | 103 | 133 | 215 | 124 |
| D 638 | Tensile strength, psi | 7025 | 10200 | 3100 | 9125 | 9550 | 10200 | 8950 |
| D 638 | Elongation, % | 4 | 5 | 2 | 2 | 4 | 8 | 5 |
| — | Flammability | 26 sec | 30 sec | 30 sec | 32 sec | 28 sec | 23 sec | 38 sec |
| | UL 94 | V-O | V-O | V-O | V-O | V-O | V-O | V-O |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the production of polyurethane moldings by reacting a reaction mixture comprising
   (a) a polyisocyanate,
   (b) an isocyanate-reactive material, and
   (c) a chain extender, said reaction mixture being processed as a one-shot system by the RIM process at an isocyanate index of from about 70 to about 130, the improvement wherein component (b) comprises a polyester polyol having a molecular weight of from about 840 to about 1500 and having the structure

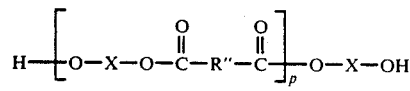

wherein
X represents

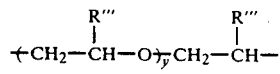

R″ represents the residue of an aromatic anhydride or aromatic dicarboxylic acid,
R‴ represents hydrogen or methyl,
y is a number of from 1 to about 14, and
p is a number of from 1 to about 5.

2. The process of claim 1 wherein R″ is the residue of a cyclic anhydride based on phthalic acid.

3. The process of claim 2 wherein R'' is the residue of phthalic anhydride, said residue being a 1,2-phenylene o group.

4. The process of claim 1 wherein R''' is hydrogen.

5. The process of claim 1 wherein p is from 1 to about 4.

6. The process of claim 1 wherein y is from about 3 to about 14.

7. The process of claim 1 wherein y is about 3.

8. The process of claim 7 wherein R'' is a 1,2-phenylene group, R''' is hydrogen, y is about 3, and p is from about 2 to about 4.

9. The process of claim 1 wherein y is about 7 to about 8.

10. The process of claim 9 wherein R'' is a 1,2-phenylene group, R''' is hydrogen, y is about 7 to 8, and p is from 1 to about 2.

* * * * *